US008819216B2

(12) United States Patent
Kelder et al.

(10) Patent No.: US 8,819,216 B2
(45) Date of Patent: Aug. 26, 2014

(54) USER INTERFACE

(75) Inventors: Mart Kelder, Tallinn (EE); Ahti Heinla, Tallinn (EE); Karlheinz Wurm, Tallinn (EE)

(73) Assignee: Skype, Dublin (IE)

( * ) Notice: Subject to any disclaimer, the term of this patent is extended or adjusted under 35 U.S.C. 154(b) by 829 days.

(21) Appl. No.: 11/799,453

(22) Filed: May 1, 2007

(65) Prior Publication Data

US 2007/0294415 A1    Dec. 20, 2007

(30) Foreign Application Priority Data

May 2, 2006   (GB) .................................. 0608627.6

(51) Int. Cl.
  *G06F 15/173*   (2006.01)
  *H04L 29/06*   (2006.01)

(52) U.S. Cl.
  CPC ..................................... *H04L 65/80* (2013.01)
  USPC ....................................................... 709/224

(58) Field of Classification Search
  CPC ....................................................... H04L 65/80
  See application file for complete search history.

(56) References Cited

U.S. PATENT DOCUMENTS

| | | | |
|---|---|---|---|
| 7,099,280 B1 * | 8/2006 | Shaffer et al. .................. | 370/252 |
| 8,245,266 B2 | 8/2012 | Jefremov | |
| 2002/0122544 A1 * | 9/2002 | Williams et al. ......... | 379/207.02 |
| 2003/0187610 A1 | 10/2003 | Dorrance et al. | |
| 2004/0047290 A1 * | 3/2004 | Komandur et al. ........... | 370/230 |
| 2004/0073641 A1 | 4/2004 | Minhazuddin et al. | |
| 2004/0133697 A1 | 7/2004 | Mamaghani et al. | |
| 2004/0190488 A1 * | 9/2004 | Bokish et al. .................. | 370/351 |
| 2005/0094646 A1 | 5/2005 | Lee | |
| 2005/0105491 A1 | 5/2005 | Chaskar et al. | |
| 2005/0136897 A1 | 6/2005 | Praveenkumar et al. | |
| 2005/0169305 A1 | 8/2005 | Mori | |
| 2005/0289395 A1 * | 12/2005 | Katsuyama et al. ............ | 714/25 |
| 2006/0020697 A1 | 1/2006 | Kelso et al. | |
| 2006/0039346 A1 * | 2/2006 | Shapiro ......................... | 370/349 |
| 2006/0045367 A1 | 3/2006 | Chao et al. | |
| 2006/0064729 A1 | 3/2006 | Steading | |

(Continued)

FOREIGN PATENT DOCUMENTS

| | | |
|---|---|---|
| CN | 1511406 | 7/2004 |
| CN | 1649320 | 8/2005 |

(Continued)

OTHER PUBLICATIONS

Microsoft Windows XP, Tech Net Help Center, Section Using the Help and Support Center, Windows XP Retail date: Oct. 25, 2001.*

(Continued)

*Primary Examiner* — Joseph Greene
(74) *Attorney, Agent, or Firm* — Sonia Cooper; Jim Ross; Micky Minhas

(57) ABSTRACT

A method of controlling communication quality between one node and at least one other node in a packet switched communication system, the method comprising the steps of detecting at one of said nodes a condition that indicates that communication quality is below an acceptable threshold, automatically generating instructions based on the detected condition for a user of the at least one node, said instructions intended to provide a remedy to improve the communication quality, and receiving input from a user of the at least one node responsive to the instructions to implement the remedy and thereby improve the communication quality.

33 Claims, 17 Drawing Sheets

(56) References Cited

U.S. PATENT DOCUMENTS

| | | | |
|---|---|---|---|
| 2007/0022185 A1 | 1/2007 | Hamilton et al. | |
| 2007/0118416 A1* | 5/2007 | Hendren | 705/8 |
| 2007/0280139 A1 | 12/2007 | Sakai | |
| 2007/0294415 A1 | 12/2007 | Kelder et al. | |
| 2008/0005626 A1 | 1/2008 | Schaff et al. | |
| 2008/0068448 A1 | 3/2008 | Hansen | |
| 2008/0168235 A1 | 7/2008 | Watson et al. | |
| 2008/0181117 A1 | 7/2008 | Acke et al. | |
| 2009/0089849 A1 | 4/2009 | Jefremov et al. | |

FOREIGN PATENT DOCUMENTS

| | | |
|---|---|---|
| CN | 1689277 | 10/2005 |
| CN | 1744575 | 3/2006 |
| CN | 101779444 | 7/2010 |
| EP | 1 071 267 A2 | 1/2001 |
| EP | 1071267 A2 * | 1/2001 |
| EP | 1 100 249 A2 | 5/2001 |
| EP | 1 235 416 A1 | 8/2002 |
| EP | 1633088 | 3/2006 |
| EP | 1708408 | 10/2006 |
| GB | 2438017 | 11/2007 |
| JP | 2002-185527 A | 6/2002 |
| JP | 2005-260384 A | 9/2005 |
| JP | 2007-228362 (A) | 9/2007 |
| WO | WO 00/33511 A1 | 6/2000 |
| WO | WO 00/72536 A1 | 11/2000 |
| WO | WO-02078289 | 10/2002 |
| WO | WO 2004/045130 A2 | 5/2004 |
| WO | WO2005/009019 | 1/2005 |
| WO | WO 2007/125413 A2 | 11/2007 |
| WO | WO-2009040143 | 4/2009 |

OTHER PUBLICATIONS

Ed Bott, Faster smarter Windows XP, 2003, Microsoft Press, Redmond Washington.*

Office Action, U.S. Appl. No. 12/004,470, dated Jan. 27, 2011, 25 pp.

Notification of Transmittal of the International Search Report and the Written Opinion of the International Searching Authority, or the Declaration from International Application No. PCT/EP2008/053687, dated Mar. 23, 2009.

U.S. Appl. No. 12/004,470, Office Action dated Oct. 14, 2010, 22 pp.

Australian Examination Report for Australian Application No. 2007245390; Date Mailed: Apr. 29, 2010, 2 pp.

$2^{nd}$ Australian Examination Report for Australian Application No. 2007245390; Date Mailed: Jun. 15, 2011, 2 pp.

Great Britain Search Report for GB Application No. GB0608627.6; Date of Search: Aug. 23, 2007, 1 pg.

Office Action, U.S. Appl. No. 12/004,470, date of mailing Sep. 20, 2011.

"Advisory Action", U.S. Appl. No. 11/799,453, (Nov. 22, 2010), 2 pages.

"Final Office Action", U.S. Appl. No. 11/799,453, (Sep. 2, 2010), 15 pages.

"Foreign Office Action", Application No. JP2009-508537, (Feb. 7, 2012), 1 page.

"International Search Report", Application No. PCT/IB2007/001185, (Oct. 5, 2007), 3 pages.

"Non-Final Office Action", U.S. Appl. No. 11/799,453, (Jan. 4, 2012), 14 pages.

"Non-Final Office Action", U.S. Appl. No. 11/799,453, (Mar. 19, 2010), 12 pages.

"Notice of Allowance", U.S. Appl. No. 12/004,470, (Apr. 11, 2012), 5 pages.

Bott, Ed "Faster Smarter Windows XP", *Microsoft Press*, Redmond Washington, (2003), 8 pages.

U.S. Appl. No 12/004,470, Notice of Allowance and Fee(s) Due, dated Jan. 5, 2012.

"Foreign Office Action", Chinese Application No. 200780053653.4, (Apr. 16, 2012), 13 pages.

"Foreign Office Action", EP Application No. 08735539.2, (Sep. 3, 2012), 4 pages.

"Foreign Office Action", EP Application No. 08735539.2, Oct. 20, 2010. 4 pages.

"Foreign Office Action", Japanese Application No. 2009508537, (Mar. 1, 2011), 6 pages.

"Foreign Office Action", Japanese Application No. 2009-508537, (Mar. 1, 2011), 6 pages.

"Foreign Office Action", Japanese Application No. 209508537, (Feb. 7, 2012), 1 page.

"International Search Report", Application No. PCT/IB2007/001185, (Oct. 5, 2007), 11 pages.

"Foreign Office Action", Chinese Application No. 200780053653.4, (Aug. 16, 2013), 12 pages.

* cited by examiner

| On Click Messaging | | |
|---|---|---|
| Skype can suggest possible ways to fix poor call quality. If you are experiencing poor call quality now, please consult our on-line call quality guide. ⊗ Call Duration 01:20 | | |
| This message can be activated at any time during the call. | | |

Cases that might occur

| Call is good | Indicator shows its bad | This situation should not occur |
|---|---|---|
| Call is good | Indicator shows its good | This is a proper indication<br>on mouseover<br>How to improve my call quality<br>on click<br>Skype can suggest possible ways to fix poor call quality. If you are experiencing poor call quality now, please consult our on-line call quality guide.<br>Call Duration 01:20 |
| Call is bad | Indicator shows its good<br><br>We did not detect its bad | This is problematic situation. Proposed to be addressed via:<br>on mouseover<br>How to improve my call quality<br>on click |

FIG. 7A

| Call is good | Indicator shows its bad 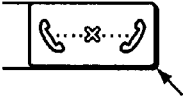 | This situation should not occur |
|---|---|---|
| | | If you are experiencing call problems, please consult our on-line guide.<br><br>Call Duration 01:20 |
| Call is bad | Indicator shows its bad  | This is proper situation<br><br>If you are experiencing call problems, closing other applications may improve call quality.<br><br>Call Duration 01:20<br><br>if user disables help pop-ups:<br>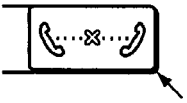<br><br>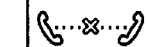<br><br>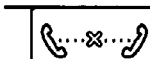<br>on mouseover:<br>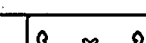<br>How to improve my call quality |

Help Messaging

FIG. 7B

TEXT STRINGS

| DIALOGUE | DESCRIPTION | STRING |
|---|---|---|
| CALL TAB | MOUSEOVER - GOOD | |
| CALL TAB | MOUSEOVER - BAD QUALITY | CALL QUALITY CAN BE ENHANCED |
| CALL TAB | RIGHT-CLICK - ENABLE | ENABLE CALL HELP TIPS |
| CALL TAB | RIGHT-CLICK - ENABLE | DISABLE CALL HELP TIPS |

FIG. 8

USER INTERFACE

RELATED APPLICATION

This application claims priority under 35 U.S.C. §119 or 365 to Great Britain Application No. GB 0608627.6, filed May 2, 2006. The entire teachings of the above application are incorporated herein by reference.

FIELD OF THE INVENTION

The present invention relates to a method for handling call quality in a communication system.

BACKGROUND OF THE INVENTION

In a communication system a communication network is provided, which can link together two communication terminals so that the terminals can send information to each other in a call or other communication event. Information may include voice, text, images or video.

One such communication system is a peer to peer communication system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer telecommunications are beneficial to the user as they are often of significantly lower cost than traditional telephony networks, such as fixed line or mobile networks. This may particularly be the case for long distance calls. These systems may utilise voice over internet protocol ("VoIP") over an existing network (e.g. the Internet) to provide these services, although alternative protocols can also be used.

Communication systems employing VoIP, or similar protocols are subject to many factors which may adversely affect call quality. For example, data packets may be lost when communication data is transmitted across the network, thereby affecting call quality. If the round trip time (RTT) for the data to be transmitted between users is great, a user may experience delay in receiving information.

Call quality may also be affected by factors attributable to the device on which the user receives data. For example if the device is a personal computer (PC), the number of applications running will affect the degree to which the central processing unit (CPU) may process communication data, thereby affecting call quality.

Poor call quality can be frustrating for a caller, and can cause him to seek alternative communication methods.

It is therefore an aim of embodiments of the invention to address at least one of the above identified problems.

SUMMARY OF THE INVENTION

In particular the invention relates, but not exclusively to providing an interface to enable a caller to control the call quality.

According to the present invention, there is provided a method of controlling communication quality between one node and at least one other node in a packet switched communication system, the method comprising the steps of detecting at one of said nodes a condition that indicates that communication quality is below an acceptable threshold; automatically generating instructions based on the detected condition for a user of the at least one node, said instructions intended to provide a remedy to improve the communication quality; receiving input from a user of the at least one node responsive to the instructions to implement the remedy and thereby improve the communication quality.

According to the present invention, there is further provided a user terminal in a packet switched communication system, said user terminal having means for effecting a communication to at least one other terminal in the communication system, the user terminal comprising means for detecting at one of said nodes a condition that indicates that communication quality is below an acceptable threshold; means for automatically generating instructions based on the detected condition for a user of the at least one node, said instructions intended to provide a remedy to improve the communication quality; and means for receiving input from a user of the at least one node responsive to the instructions to implement the remedy and thereby improve the communication quality.

BRIEF DESCRIPTION OF THE DRAWINGS

For a better understanding of the present invention and to show how the same may be carried into effect, embodiments of the present invention will now be described with reference to the following drawings:

FIGS. 7A-7B illustrate example text strings when the user clicks on an icon for different indications of call quality.

FIG. 8 illustrates example text strings displayed when a user rolls over an icon with a mouse.

DETAILED DESCRIPTION OF THE INVENTION

Figure 1:
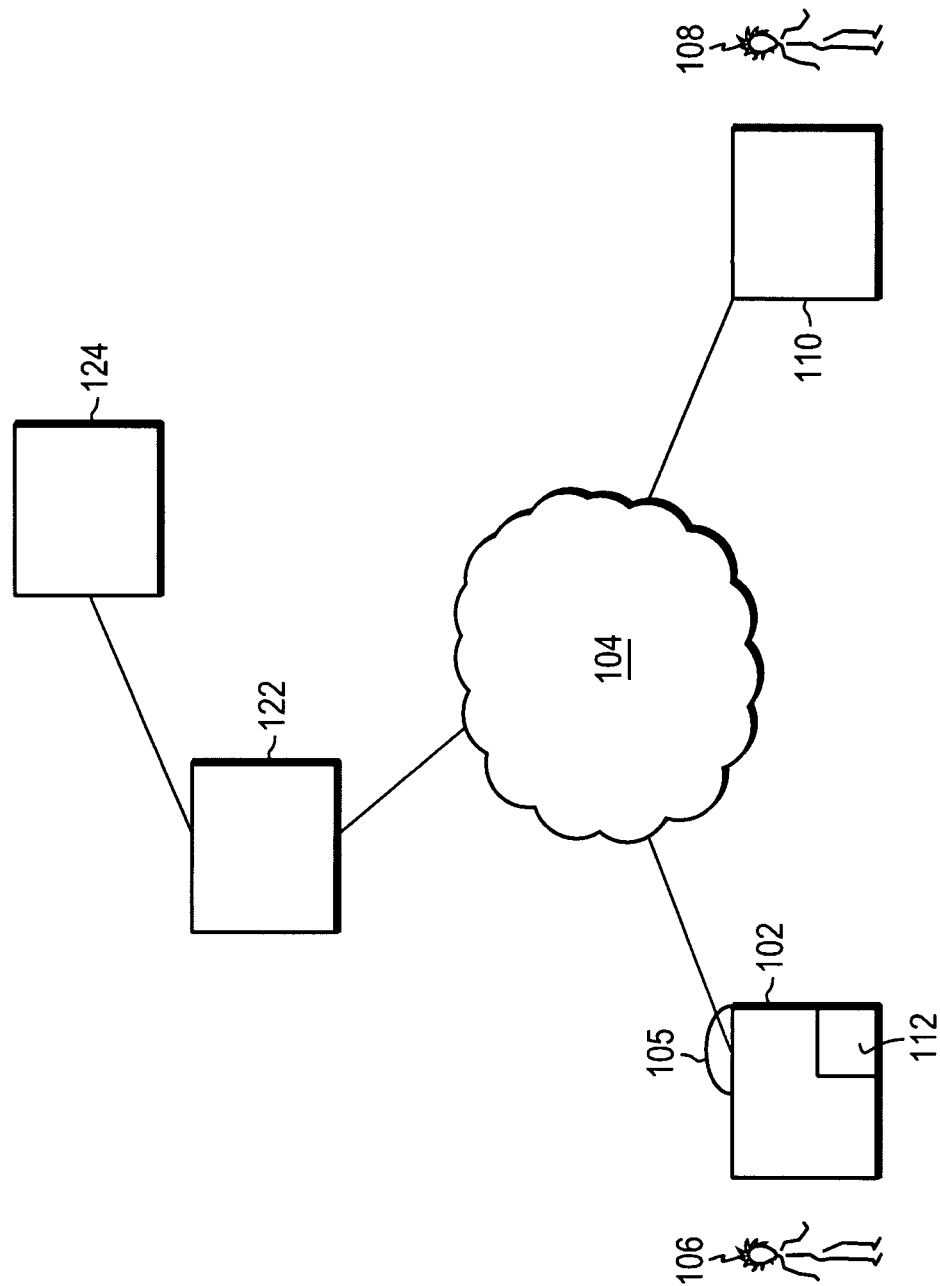
FIG. 1 is a schematic representation of a peer to peer telephony system.

Reference will first be made to FIG. 1, in which is shown a peer-to-peer telephony system 100. It should be appreciated that even though the exemplifying telecommunications network shown and described in more detail uses the terminology of a peer to peer network, embodiments of the present invention can be used in any other suitable form of network.

A user terminal 102 is shown connected to a network 104. The user terminal may be, for example, a personal computer, a gaming device, a personal digital assistant, a suitably enabled mobile phone, a television or other device able to connect to the network 104. The user terminal 102 is connected to the network 104 via a network port 105, and may be via a cable (wired) connection or a wireless connection. The network 104 may be a network such as the Internet.

Client software 112 is installed on the user terminal 102 to allow the end users to communicate via the communications network. A user interface of terminal 102 may be controlled by the client software program 112, hereinafter referred to as the client, to display user facilities and to indicate events occurring, such as an incoming call. According to an embodiment of the invention the client 112 may also be arranged to display communication quality options as will be described hereinafter.

If the user terminal is connected to the network 104, then it may be running a client program 112 provided by the operator of the peer-to-peer telephony system. The client 112 is executed on a local processor in the user terminal 102.

The client 112 has a number of different components or layers for implementing various functions, including a protocol layer 402 (FIG. 3) for managing the network interface. In the present embodiment the protocol layer monitors the call quality parameters, but it will be appreciated that other divisions of layers are possible.

Figure 3:
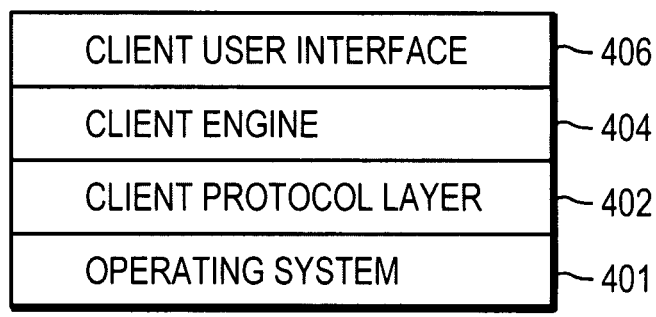
FIG. 3 shows a client stack according to an embodiment of the present invention.

FIG. 3 shows a client stack according to an embodiment of the present invention. As shown the client protocol layer sits on top of the operating system 401 of the device. Above the protocol layer 402 is the client engine 404. The client engine 404 is used to control the client user interface layer 406. The control of the client user interface 406 will be explained in more detail hereinafter.

A user of a second user terminal 110 can make a telephone call to the user of the user terminal 102 across the network 104. To initiate the call, the second user 108 can click on the contact listed for the user 106 operating terminal 102 displayed in a client running on the second user terminal 110 similar to the client running on the user terminal 102. Alternatively the user 108 can type in a telephone number or username for the user 106. The client then sets up the call to the user 106. The telephone call may be made using VoIP, in accordance with methods known in the art, such as disclosed in WO 2005/009019. The telephone call may comprise voice, video, instant messaging ("IM"), short message service (SMS) or a combination thereof.

In an alternative embodiment the second user terminal 110 may be connected to a different network such as the public switched telephone network ("PSTN") or a mobile network (not shown in FIG. 1). If connected to the PSTN, the second user terminal may be a fixed line telephone, and if connected to a mobile network, the second user terminal may be a mobile telephone.

Figure 2:
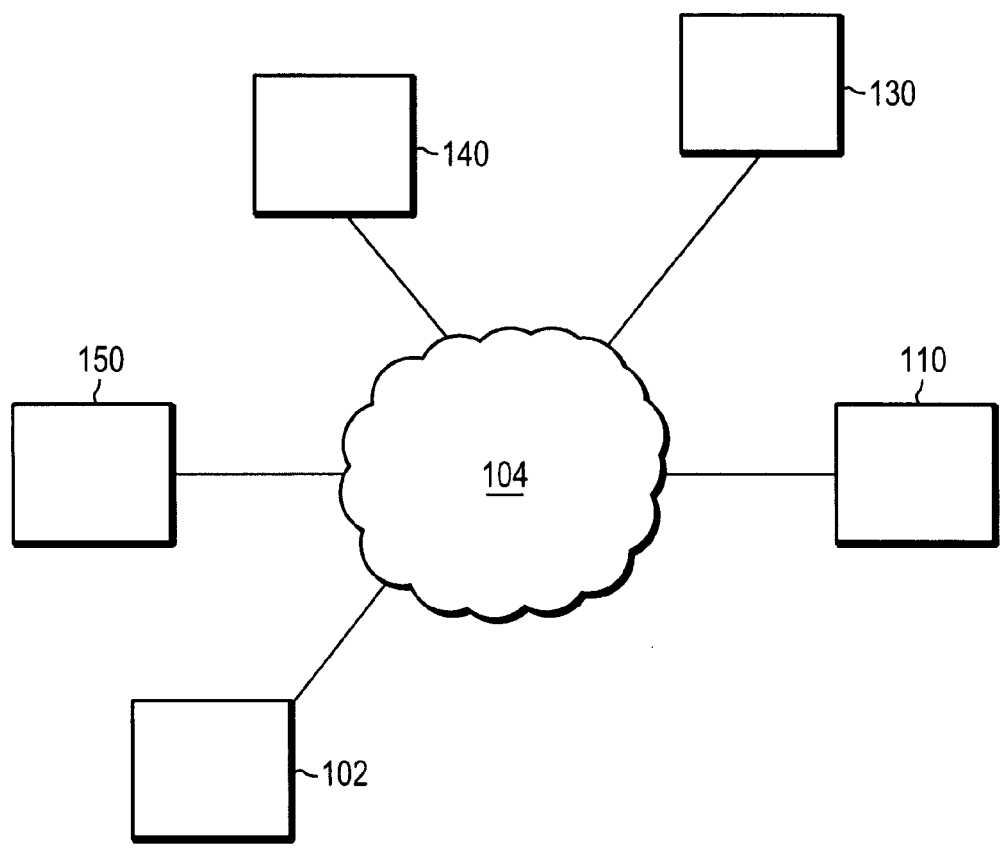
FIG. 2 is a further schematic representation of a peer to peer telephony system.

In a further alternative embodiment of the invention, as shown in FIG. 2, more than two user terminals (102, 110, 130, 140 and 150) may be connected across the network 104 such that the communication data is shared between each of the users in a conference call.

In a further alternative embodiment, in the case where there are more than two users involved in a conference call, one or more users may be connected to a different network such as a PSTN or a mobile network.

As shown in FIG. 1, in one embodiment a back end server 122 and a web application 124 may also be connected to the network 104. The backend server 122 and the web application 124 may be located within a private network of the operator of the telephony system. The backend server 122 and the web application 124 may be geographically co-located, or may be geographically separated. The backend server 122 is located between the web application 124 and the network 104, and is responsible for exchanging messages between the web application 124 and the client 112. The backend 122 and the client 112 communicate using a proprietary protocol, and do not use HTTP. This is to avoid the detection and blocking of HTTP messages by third parties and firewalls. Furthermore, the backend server 122 also blocks HTTP.

In order to be able to communicate across the network, the user 106 must be suitably registered and authenticated. Access is checked using public key cryptography. The protocol layer of the client 112 may be arranged to periodically poll the backend server 122 using the protocol for a new version of the public key. The backend server 122 forwards the request to the web application 124. The web application 124 returns the key to the backend server 122 in step, and this is passed to the client 112 using the protocol in a user identity certificate (UIC). The above steps are performed periodically, without the user being aware of its operation, in order to ensure that the key information is always up to date in the client 112.

In an embodiment of the invention the client 112 provided on terminal 102 is arranged to monitor at the terminal at least one parameter indicative of call quality. The parameter monitored may be dependent on the type of user terminal and/or on the type of communication.

According to one embodiment of the invention the client monitors the proportion of the CPU of terminal 102 that is used in handling the communication with user terminal 110. The client may also be arranged to additionally monitor the usage of the CPU by other applications that are not involved in handling the communication. The amount that the CPU is used by the communication may then be compared to the usage of the CPU by other applications in order to determine if there is a sufficient proportion of the CPU dedicated to handling the communication. The client may determine that there is a sufficient proportion of the CPU dedicated to handling the communication by comparing the monitored amount to a predefined threshold amount.

According to an embodiment of the invention, if it is determined that an insufficient proportion of the CPU is dedicated to handling the call, the client may be arranged to control the user interface to indicate to the user that the communication quality is poor. The user may then be prompted to remedy the situation. In accordance with an embodiment of the invention the client may also provide the user with instructions for remedying the situation.

Figure 4:
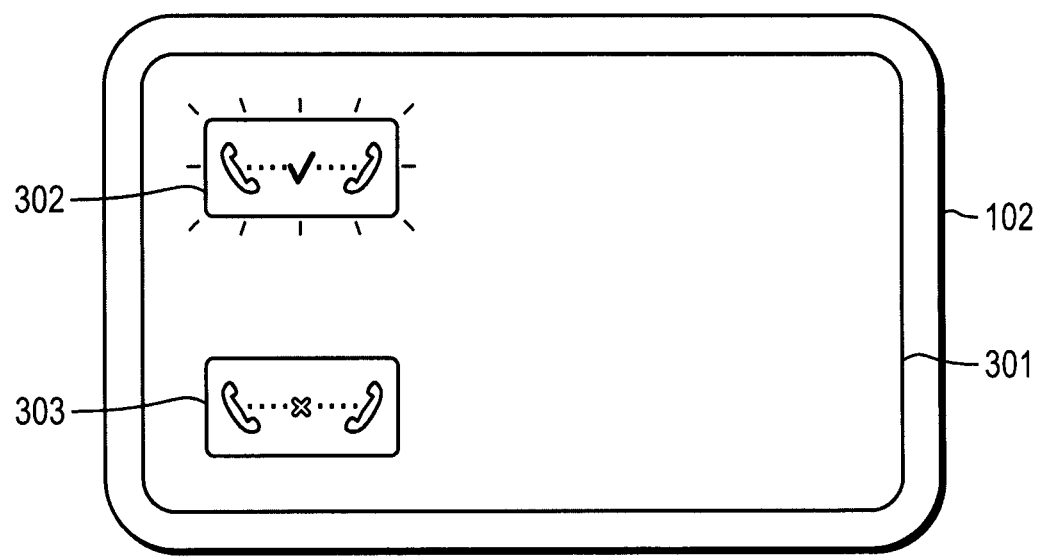
FIG. 4 is a schematic representation of a display screen of a user terminal according to an embodiment of the present invention.

In one embodiment of the invention the client engine is arranged to control the user interface to display a communication quality indicator. This may appear as a an icon, otherwise referred to as a graphic button 302, 303 on a display screen 301 of the terminal 102 as shown in FIG. 4. In an alternative embodiment of the invention, if it is not possible to display the indicator on a screen the indicator may be provided by an LED.

If client engine receives notification from the client protocol layer that an insufficient proportion of the CPU is dedicated to handling the call, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'If you are experiencing call problems, closing other applications may improve the call quality.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to usage of the CPU by other applications the advanced message may state for example that:

'The CPU usage is very high. To resolve this problem please close other applications and stop any downloads.'

The client running on the second user terminal 110 which the first user terminal 102 is in communication with may be arranged to display a message to user 108 indicating that the first user terminal is experiencing communication problems. This can be communicated to the second user terminal 110 via the communications protocol.

Accordingly the user may close other applications and terminate any downloads in order to receive a better quality call.

In the case where a number of users are involved in a conference call as shown in FIG. 2, each caller sends its data to the user who started the call (conference host) which in turn sends it to other participants in the call.

In one embodiment of the invention the user terminals 102 and 110 may be arranged to transfer video data from a webcam during a call, otherwise known as 'video chat'. During a video chat session the client monitors the proportion of the CPU of terminal 102 that is being used to run the webcam's application. The amount that the CPU is used for the audio part of the communication may then be compared to the usage of the CPU by the webcam application, and indeed any other applications running on the CPU, in order to determine if there is a sufficient proportion of the CPU dedicated to handling the communication. The client may determine that there is a sufficient proportion of the CPU dedicated to handling the audio part of the communication by comparing the monitored amount to a predefined threshold amount.

According to an embodiment of the invention, if it is determined that an insufficient proportion of the CPU is dedicated to handling the call, the client may be arranged to control the user interface to indicate to the user that the communication quality is poor. The user may then be prompted to remedy the situation. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED or similar alternative interface.

If client engine receives notification from the client protocol layer that an insufficient proportion of the CPU is dedicated to handling the call, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'You may be experiencing call problems. Stopping video and closing other applications may improve your call quality.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to usage of the CPU by other applications the advanced message may state for example that:

'Please make sure that your video software is not running in the background.'

The client running on the second user terminal which the first user terminal 102 is in communication with may be arranged to display a message indicating that the first user terminal is experiencing communication problems.

Accordingly the user of terminal 102 may then close the video application in order to improve the call quality.

According to another embodiment of the invention the client determines the speed of the CPU of terminal 102. The performance of the CPU is measured before the call by all participants and this information is sent to the other party at call set up.

The number of processor performance units measured in MHz utilised by the client, should be less than 700, regardless of the performance of the CPU. Thus if it is evident that there is insufficient CPU performance available, this formula can be used to check whether the reason is that the client is using more CPU than it normally should. If not, the problem may be something else, such as the CPU performance being too low to handle calls.

According to an embodiment of the invention, if it is determined that the speed of the CPU is too slow to handle the call, the client may be arranged to control the user interface to indicate to the user that the communication quality is poor and the reason for the poor communication.

In one embodiment of the invention the client engine is arranged to control the user interface to display a communication quality indicator. This may appear as a graphic button 302, 303 on a display screen 301 of the terminal 102 as shown in FIG. 4. In an alternative embodiment of the invention, if it is not possible to display the indicator on a screen the indicator may be provided by an LED or a further alternative user interface.

If client engine receives notification from the client protocol layer that the CPU speed is too slow to handle the call, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'Your computer's processing speed may be too slow to make clear calls.'

In an alternative embodiment of the invention the client engine may be arranged to control the client user interface to run an audio message to the user using a speaker in the device describing reasons for the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to the speed of the CPU the advanced message may provide recommended system requirements. Where the terminal is a PC the message may state for example that:

'Recommended system requirements: 1 GHz processor, 256 MB RAM:'

Where the terminal is a Mac the message may state for example that:

'Recommended system requirements: Macintosh with PowerPC G4 running Mac OS X v 10.3, 400 MHz processor, 256 MB RAM'

The client running on the second user terminal which the first user terminal 102 is in communication with may be arranged to display a message indicating that the first user terminal is experiencing communication problems.

In one embodiment of the invention the terminal may be involved on a conference call as shown in FIG. 2. In this case the client running on each user terminal 110, 130, 140 and 150 is arranged to display a message indicating that the first user terminal 102 is experiencing communication problems.

According to a further embodiment of the invention the client may detect that the CPU resource consumption by the application handling the call is too high, as discussed earlier.

According to an embodiment of the invention, if it is determined the resource consumption of the CPU by the application handling the call is too high, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button 302, 303 on a display screen 301 of the display device as shown in FIG. 4. In an alternative embodiment of the invention, if it is not possible to display the indicator on a screen the indicator may be provided by an LED, or any other suitable user interface.

If client engine receives notification from the client protocol layer that the resource consumption of the CPU by the application handling the call is too high, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'The call application is using a high amount of resources. We suggest restarting the application.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to usage of the CPU by the application handling the call the advanced message may state for example that:

'The call application is using more system resources that it should be. Try disabling any other application that may be using the call application. If the problem persists please contact your operators customer services.'

The client running on the second user terminal which the first user terminal 102 is in communication with may be arranged to display a message indicating that the first user terminal is experiencing communication problems.

According to a further embodiment of the invention the client is arranged to measure the round trip time (RTT) for the communication. RTT may be measured by periodically sending a special test packet to the remote party and measuring the time it takes for the reply to arrive.

If it is determined the RTT exceeds a threshold, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED, or any other suitable user interface.

If client engine receives notification from the client protocol layer that the RTT is too high, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'If you are experiencing call problems, please redial for better call quality.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to RTT the advanced message may state for example that:

'If you are experiencing sound delays echo or unwanted noise it may be caused by other applications using the internet and consuming bandwidth. Please close applications or stop downloads to help resolve this problem.'

The client running on the second user terminal which the first user terminal 102 is in communication with may be arranged to display a message indicating that the first user terminal is experiencing communication problems.

The user may then close other applications that are using the internet in order to obtain better call quality.

According to a further embodiment of the invention the client is arranged to monitor the packet loss for the communication. Packet loss may be monitored by keeping track of the number of packets sent, and periodically receiving information from the other party indicating the number of packets received. By comparing these two numbers, it is possible to deduce the number of packets lost in communication, and calculate the packet loss as the ratio between packets lost and packets sent.

If it is determined the packet loss exceeds a threshold, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button 302, 303 on a display screen 301 of the user terminal 102 as shown in FIG. 4. In an alternative embodiment of the invention, if it is not possible to display the indicator on a screen the indicator may be provided by an LED, or any other suitable user interface.

If client engine receives notification from the client protocol layer that the loss of data packets is too high, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'You may be experiencing call problems. Closing other applications may improve your call quality.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to packet loss the advanced message may state for example that:

'If you are experiencing sound delays echo or unwanted noise it may be caused by other applications using the internet and consuming bandwidth. Please close applications or stop downloads to help resolve this problem.'

The client running on the second user terminal which the first user terminal 102 is in communication with may be arranged to display a message indicating that the first user terminal is experiencing communication problems.

According to a further embodiment of the invention the client is arranged to detect the local NAT (Network Address Translation) router involved in the communication.

Two NAT types will be referred to herein: suitable and unsuitable, expressed in relation to send quality communications between computers.

If it is determined the local NAT type is unsuitable, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED, or any other suitable user interface.

If client engine receives notification from the client protocol layer that the local NAT type is unsuitable, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'You may be experiencing call problems. Please redial for better quality.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due the detected NAT type the advanced message may state for example that:

'Your calls are relayed through the internet. Call quality could be poor if your router configuration prevents the application handling your call from achieving the optimum relay for calls. For better call quality you could change your firewall or router settings. An online guide will help you do this, or you can seek the help of your system administrator.'

The client running on the second user terminal which the first user terminal 102 is in communication with may be arranged to display a message indicating that the first user terminal is experiencing communication problems.

The user of terminal 102 may then either redial immediately or change firewall and router settings of the device before redialling in order to improve the quality of the connection with the user of terminal 110.

According to a further aspect of the invention the client is arranged to detect whether or not the received data stream is direct User Datagram Protocol UDP in addition to detecting the local NAT router type.

If it is determined that the received data stream is not direct UDP and the local NAT type is detected as being unsuitable, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED, or any other suitable user interface.

If client engine receives notification from the client protocol layer that the received data stream is not direct UDP and the local NAT type is detected as being unsuitable, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'If you are experiencing call problems this may be because your call application may have restricted access to the internet. Please review your firewall or security settings to ensure that the call application is not restricted from accessing the internet.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due the detected NAT type the advanced message may direct the user to an website which provides information on how to remedy the problem. The message may state for example that:

'To learn more about changing your firewall settings please consult our online guide to firewalls. Our guide will tell you how to optimise your settings.'

The client running on the second user terminal which the first user terminal 102 is in communication with may be arranged to display a message indicating that the first user terminal is experiencing communication problems.

The user of terminal 102 may then either redial immediately or change firewall and router settings of the device before redialling in order to improve the quality of the connection with the user of terminal 110.

According to a further embodiment of the invention if the client detects that the call quality is poor the client may be arranged to run an algorithm to determine whether the quality is due to NAT (Network Address Translation) routers or relayed calls and to provide more specific help messages. Whether the network transport quality is good or bad is determined by a formula calculated from the monitored parameters such as RTT and packet loss.

This algorithm will be described with respect to FIG. 5.

At step S1 the client determines that the call quality is poor.

At step S2 it is determined if the received data stream at the terminal is not direct UDP.

If the received data stream is not direct UDP, at step S3 it is determined if the local NAT type is unsuitable.

If the NAT type is unsuitable, at step S4 the client is arranged to control the user interface to indicate to the user that the communication quality is poor. The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message displayed at step S4 states that:

'Your firewall is too strong, consider opening up UDPout.'

If the NAT type is not unsuitable, at step S5 it is determined if the call is a peer to peer call.

If the call is not a peer to peer call the algorithm continues to step S14. If however the call is a peer to peer call the algorithm continues to step S6.

At step 6 it is determined if the remote NAT type is unsuitable. If so the algorithm continues to step S7.

At step S7 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S4 states that:

'Your Remote Firewall is too strong. You should consider opening an alternative port.'

If it is determined at step S6 that the remote NAT type is not unsuitable the algorithm continues to step S8.

At step S8 it is determined if the local NAT type is unsuitable. If so the algorithm continues to step S9.

At step S9 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S9 states that:

'Your NAT box is p2p [peer to peer] unfriendly. Consider replacing it with a better model.'

If it is determined at step S8 that the NAT type is not unsuitable the algorithm continues to step S10.

At step S10 it is determined if the remote NAT type is unsuitable. If so the algorithm continues to step S11. The remote NAT is the NAT at the internet connection of the other party involved in the call, whereas the local NAT is at the local computer.

At step S11 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S11 states that:

'Your remote NAT box is p2p unfriendly. Consider replacing it with a better model.'

If it is determined at step S10 that the remote NAT type is not unsuitable, the algorithm continues to step S12.

At step S12 the client determines if neither the local nor, in the case of a peer to peer call, the remote NAT type is 'untested'. If this is the case the algorithm continues to step S13. Otherwise the algorithm continues to step S14.

At step S13 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S13 states that:

'Direct UDP connection could not be established for unknown reason.'

At step S14 the client is arranged to check the local bandwidth, i.e. the bandwidth of the internet connection of the local computer. If the bandwidth is found to be less than 5 kbytes/sec the bandwidth is determined to be to slow and the algorithm continues to step S15.

At step S15 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S15 states that:

'Your internet connection is too slow.'

The remedy is to obtain a further connection.

If however the local detected bandwidth is found to be greater than 5 kbytes/sec the algorithm continues to step S16.

At step S16 it is determined if the call is a peer to peer call. If so the algorithm continues to step S17.

At step S17 the client is arranged to detect the remote bandwidth. If the remote bandwidth is found to be less than 5 kbytes/sec the algorithm continues to step S18.

At step S18 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S18 states that:

'Your remote internet connection is too slow.'

If however the remote bandwidth is found to be greater than 5 kbytes/sec the algorithm continues to step S19.

At step S19 it is determined if the speed of the remote CPU, i.e. the CPU of the other party involved in the call is less than 500 MHz. If so the algorithm continues to step S20.

At step S20 the client is arranged to control the user interface to indicate to the user that the communication quality is poor. The client engine is also arranged to control the user interface to display a help text message, in a window, notifying the user of how to remedy the problem. In the case where the user device is a PC, this may be accessed by the user selecting the graphic button 303 (shown in FIG. 4) using a mouse. Alternatively the message may be displayed automatically, together with the call indicator. The message displayed at step S20 states that:

'Remote CPU has too slow connection.'

In the case where the user terminal 102 is connected to the network with a wireless connection, according to a further embodiment of the invention, the client is arranged to monitor the signal strength of the wireless connection.

If it is determined that the wireless signal strength is below a predetermined threshold, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED, or any other suitable user interface.

If client engine receives notification from the client protocol layer that the wireless signal strength is too low, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'If you are experiencing call problems, moving closer to the wireless router of plugging in your network cable may improve your call quality.'

In an alternative embodiment of the invention the client engine may be arranged to control the client user interface to run an audio message to the user using a speaker in the device describing how to remedy the problem.

The client running on the second user terminal which the first user terminal 102 is in communication with may be arranged to display a message indicating that the first user terminal is experiencing communication problems.

Accordingly the user may move closer to the wireless router in order to improve the signal strength and improve the call quality. Alternatively the user may connect to the network with a wired connection in order to improve the quality of the call.

According to a further embodiment of the invention the client is arranged to monitor the local bandwidth of the network connection.

If it is determined that the local detected bandwidth is below a predefined threshold, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED, or any other suitable user interface.

If client engine receives notification from the client protocol layer that the local bandwidth of the network connection is too low, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'If you are experiencing call problems this may be caused by a slow internet connection.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due slow internet connection the advanced message may state for example that:

'The minimum network requirements to use the calling application are a dial up connection with at least a 33.6 Kbps modem. The best call quality is provided by a broadband internet connection.'

The client running on the second user terminal which the first user terminal 102 is in communication with may be arranged to display a message indicating that the first user terminal is experiencing communication problems.

Accordingly the user can review their network connection and switch to a broadband connection for better call quality.

According to a further embodiment of the invention, if the second user terminal 110 is connected to the network 104 via a different network such as a PSTN it may be that the reason for poor communication quality is due to the other network. In this case the user may be prompted to report the problem to the operator. In one embodiment of the invention statistics may be collected based on the call length to a particular country. Short calls may indicate that the network provider in that country is bad. These statistics may be used to inform the user of why the quality is poor.

If it is determined that the network provider of the called user terminal 110 is the reason for the poor quality of the call, the client may be arranged to control the user interface to indicate to the user that the communication quality is poor. In accordance with an embodiment of the invention the client may also provide the user with instructions for remedying the situation.

In one embodiment of the invention the client engine is arranged to control the user interface to display a communication quality indicator. This may appear as a graphic button on a display screen of the display device as shown in FIG. 4. In an alternative embodiment of the invention, if it is not possible to display the indicator on a screen the indicator may be provided by an LED, or any other suitable user interface.

If client engine receives notification from the client protocol layer that the network provider of the called user is at fault, the client engine will control the user interface to display a graphic button 303 indicating that the call quality is poor.

The client engine may also be arranged to control the user interface to display a help text message, in a window, notifying the user of how to remedy the problem. In the case where the user device is a PC, this may be accessed by the user selecting the graphic button 303 using a mouse. Alternatively the message may be displayed automatically, together with the call indicator. The message may for example state that:

'Network conditions may be causing poor quality to this particular number Please try redialling now.'

In an alternative embodiment of the invention the client engine may be arranged to control the client user interface to run an audio message to the user using a speaker in the device describing how to remedy the problem.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to the network provider of the called user the advanced message may state for example that:

'Some calls are made through other telephone networks. Fluctuations in these networks cause the call quality to vary. Please redial to improve your call quality. If this problem persists, please report this destination to the operator services.'

Accordingly the user can redial to achieve a call with better call quality.

Figure 5:
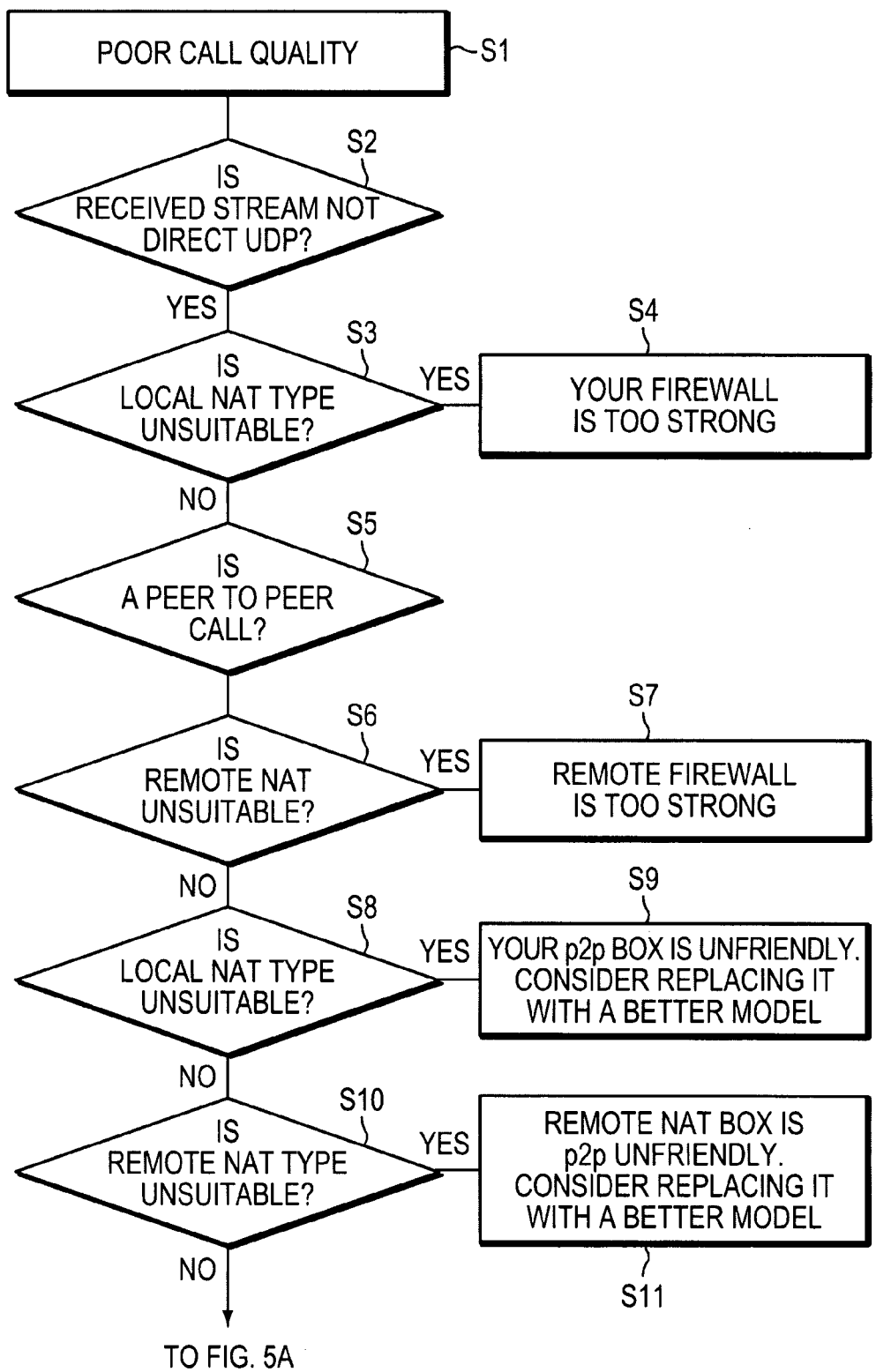
FIG. 5 shows the steps of an algorithm according to the present invention.
Figure 5A:
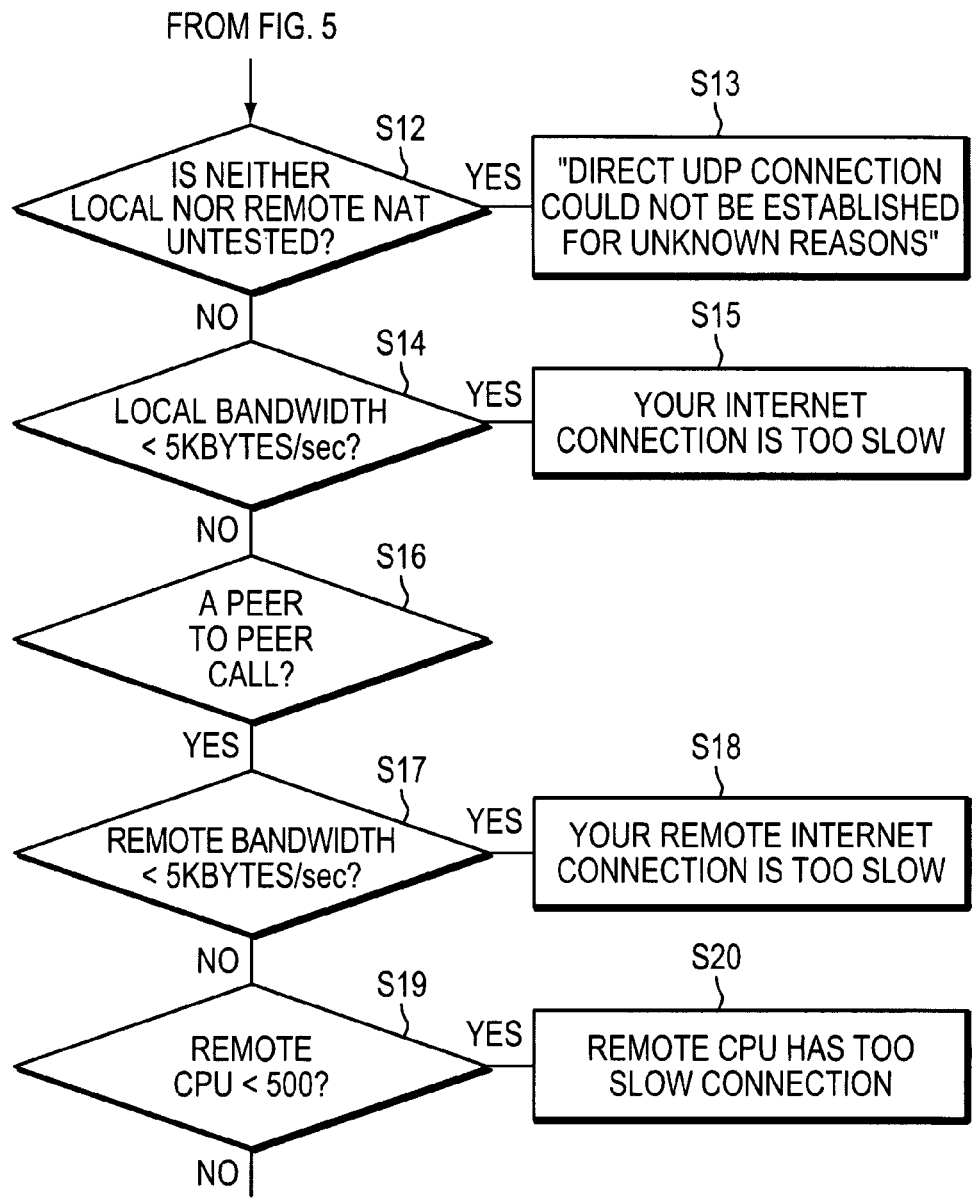

In an embodiment of the invention the client may be arranged to determine a plurality of call quality factors in accordance with the steps of an algorithm which implement the steps of the flowchart of FIG. 5.

In an embodiment of the invention when the detected call quality is good the device is arranged to indicate this to the user. Referring to FIG. 4, this may be good call quality may be indicated by icon 302.

As stated previously, the help messages may be automatically displayed to a user when a problem is identified by the client. Alternatively the message may only be provided to the user when the user clicks on an icon.

In one embodiment of the invention, if the detected call quality is bad the icon may turn a different colour to indicate a problem and to further indicate that there is a help message available.

Figure 6:
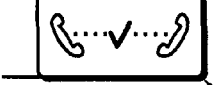
FIG. 6 illustrates an example of a glow sequence according to an embodiment of the present invention.
Figure 9:
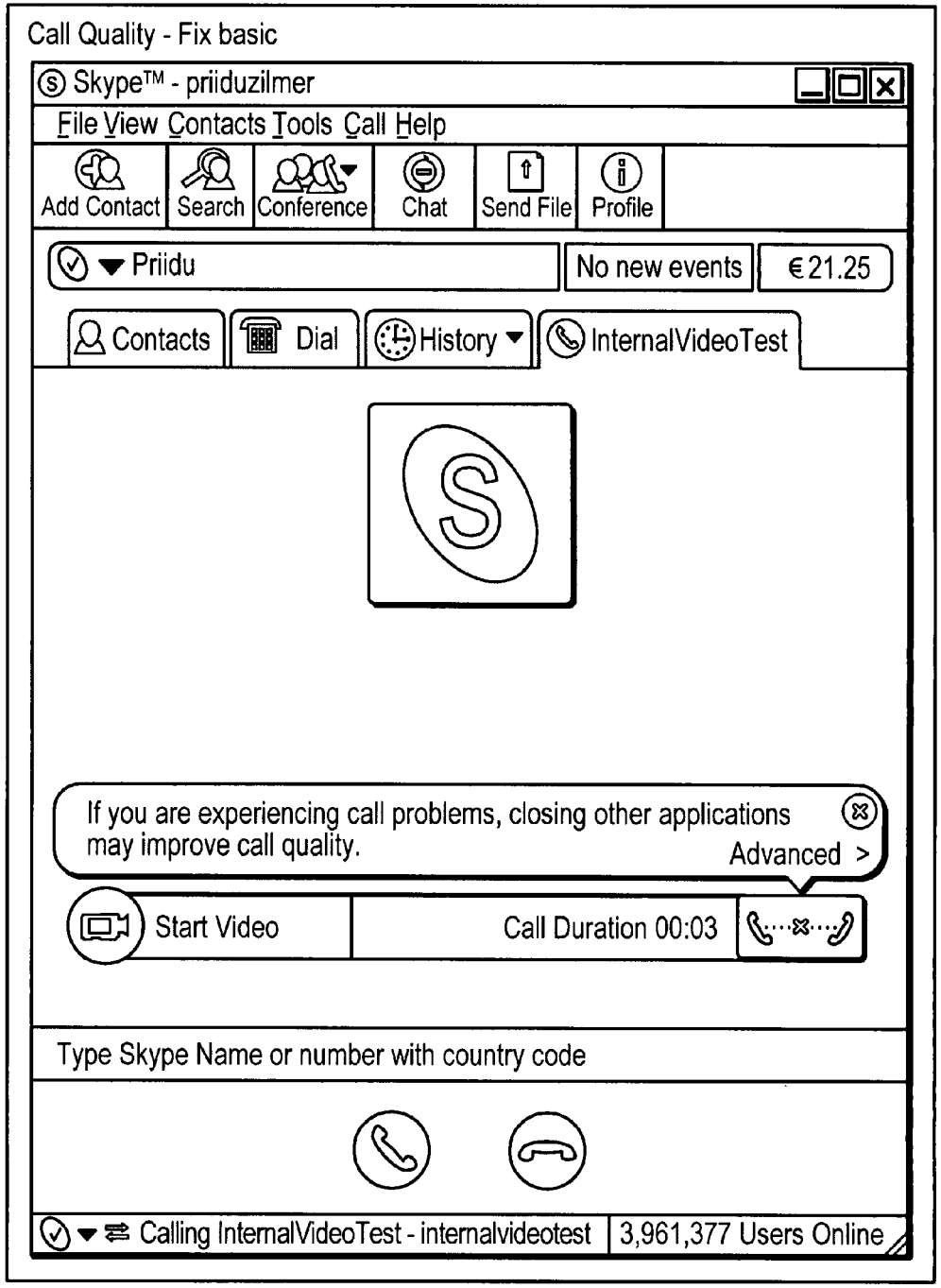
FIGS. 9-15 illustrate display screens showing help messages during a call.
Figure 10:
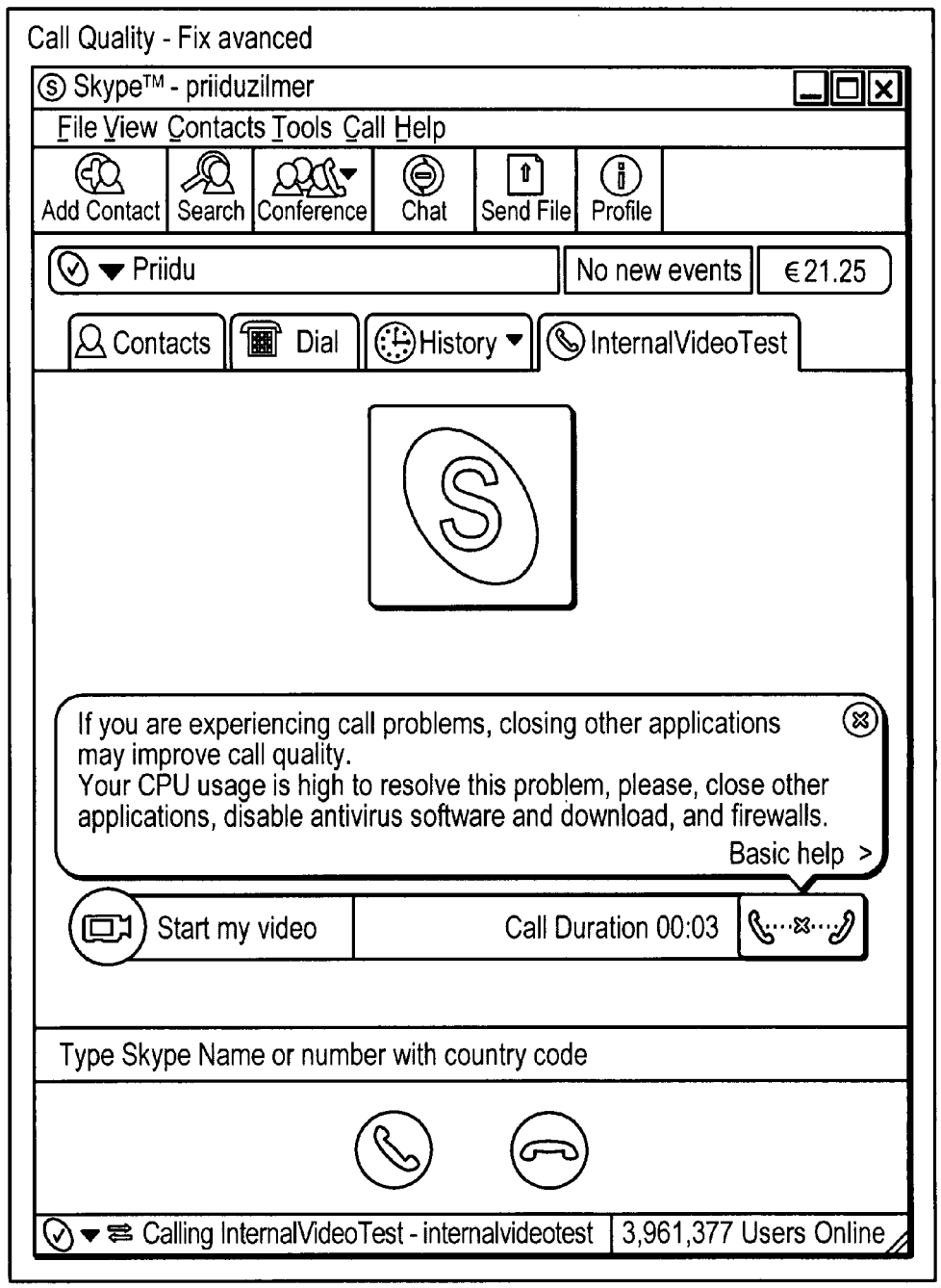
Figure 11:
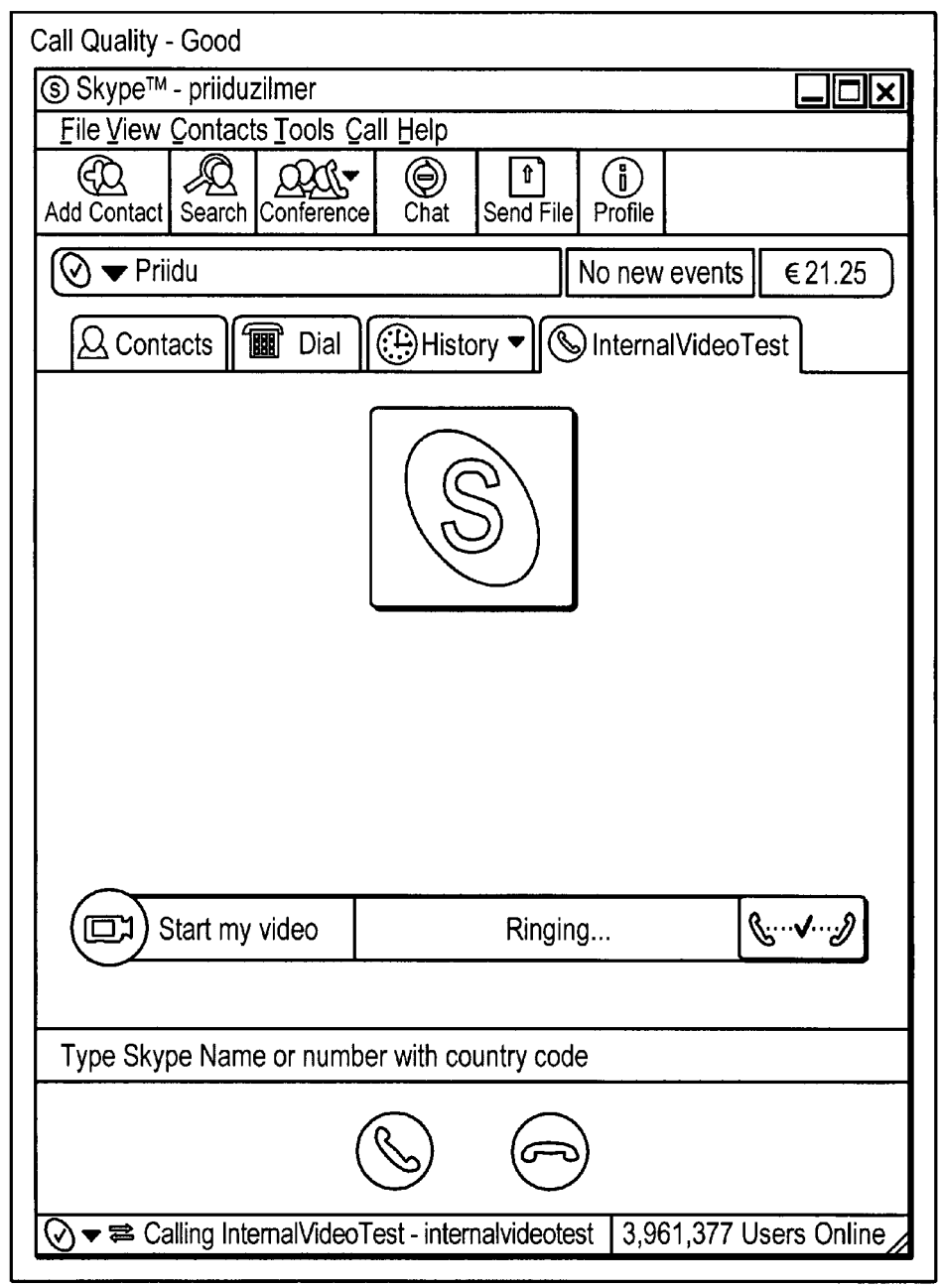
Figure 12:
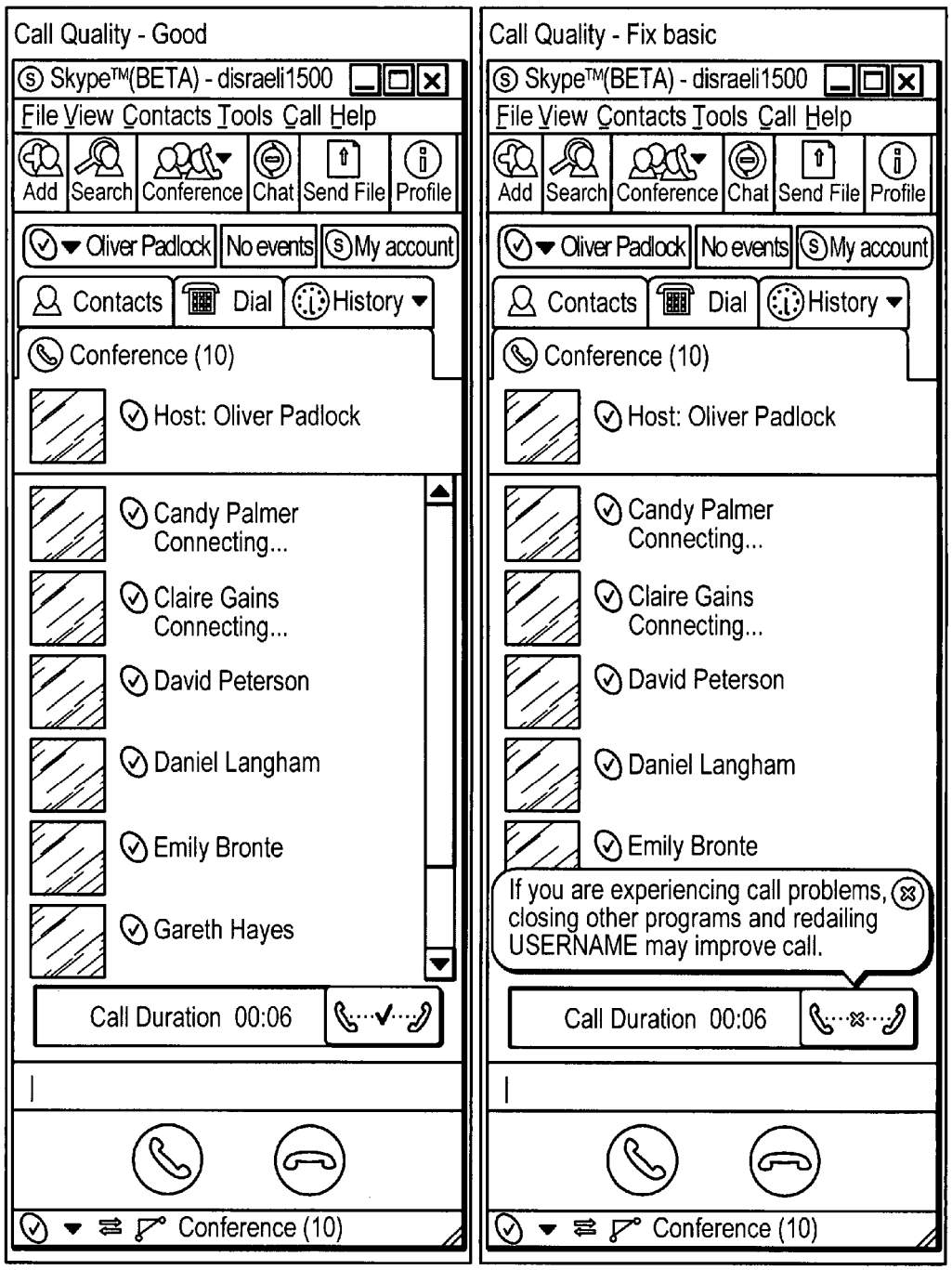
Figure 13:
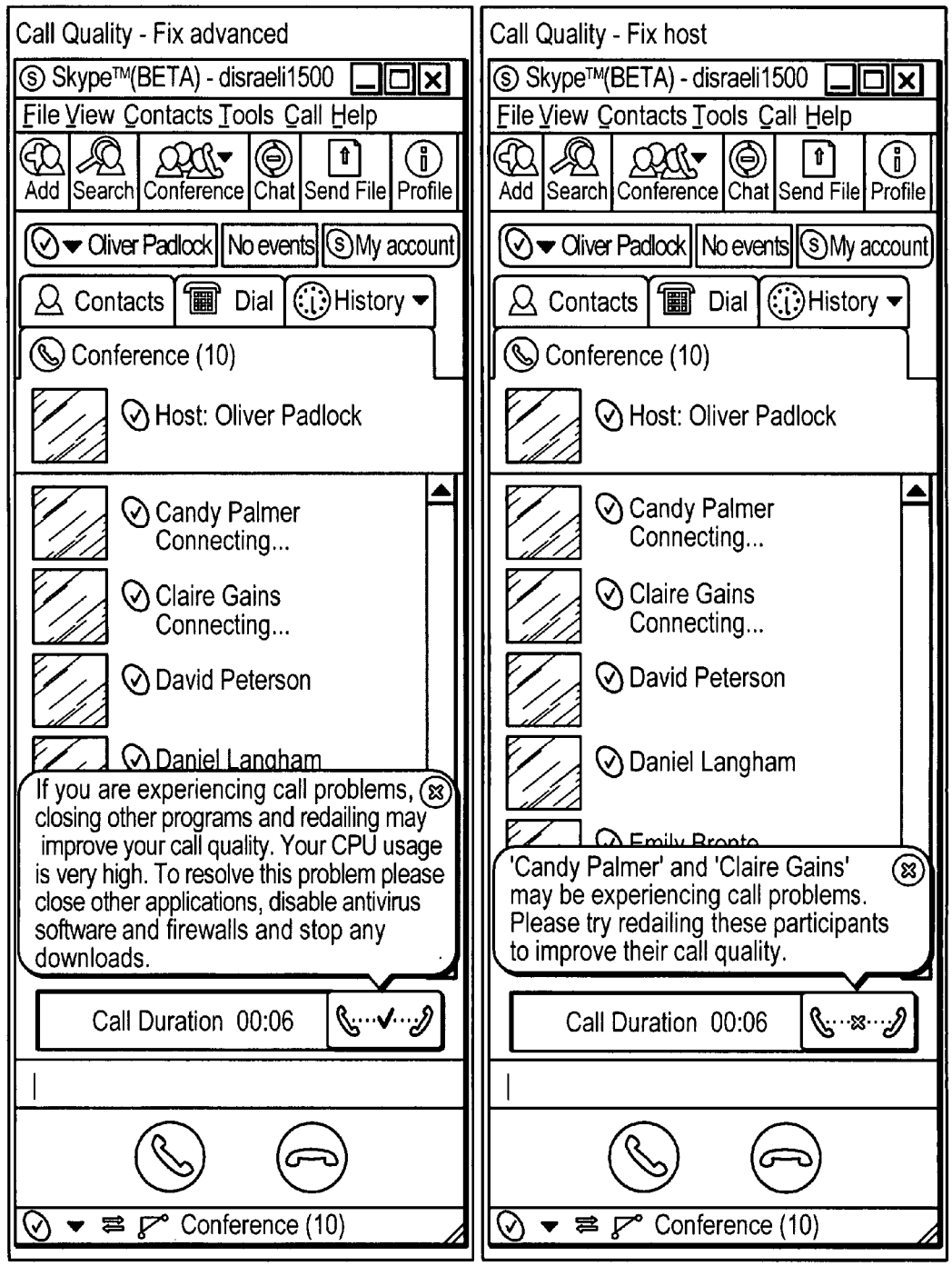
Figure 14:
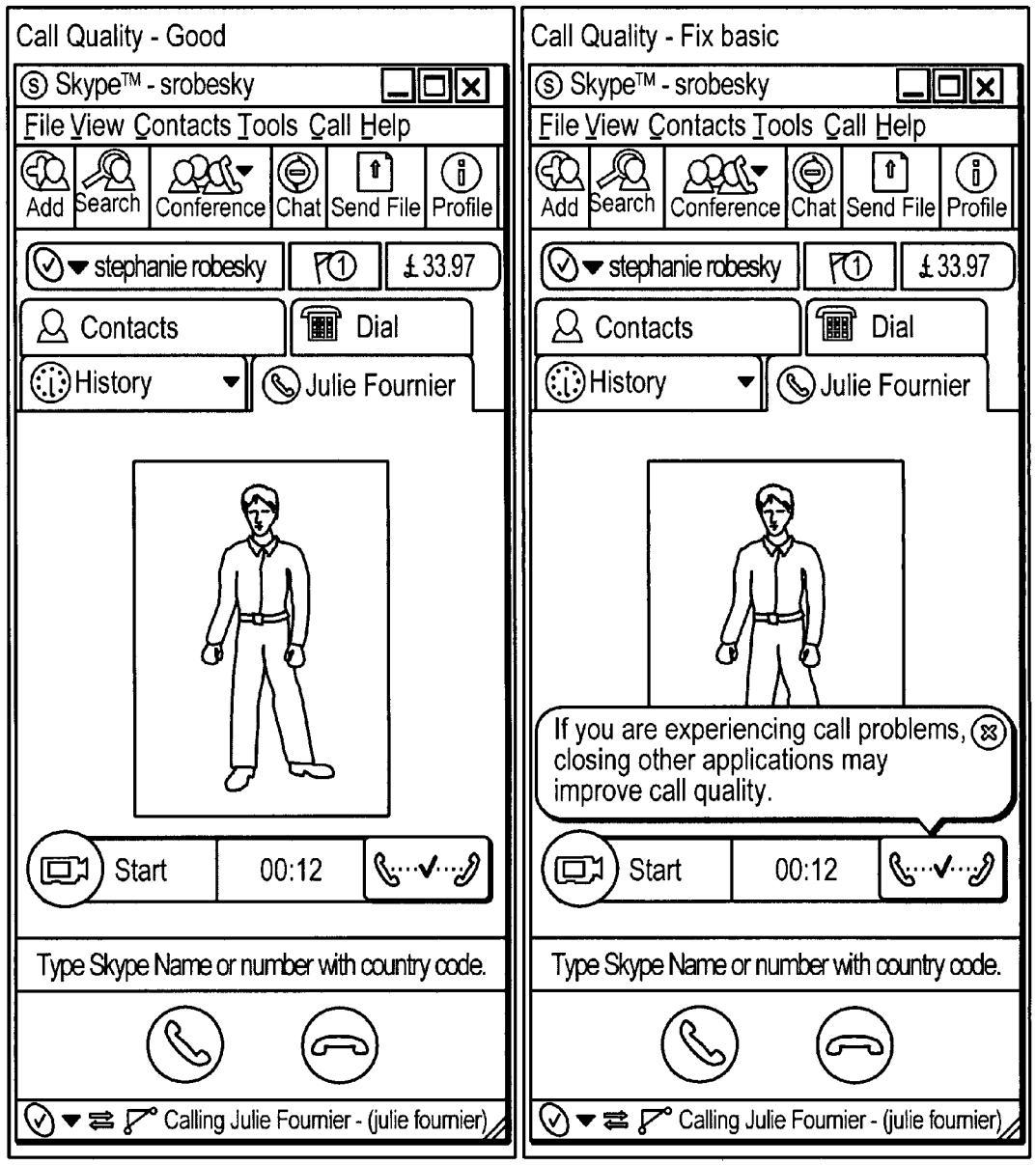
Figure 15:
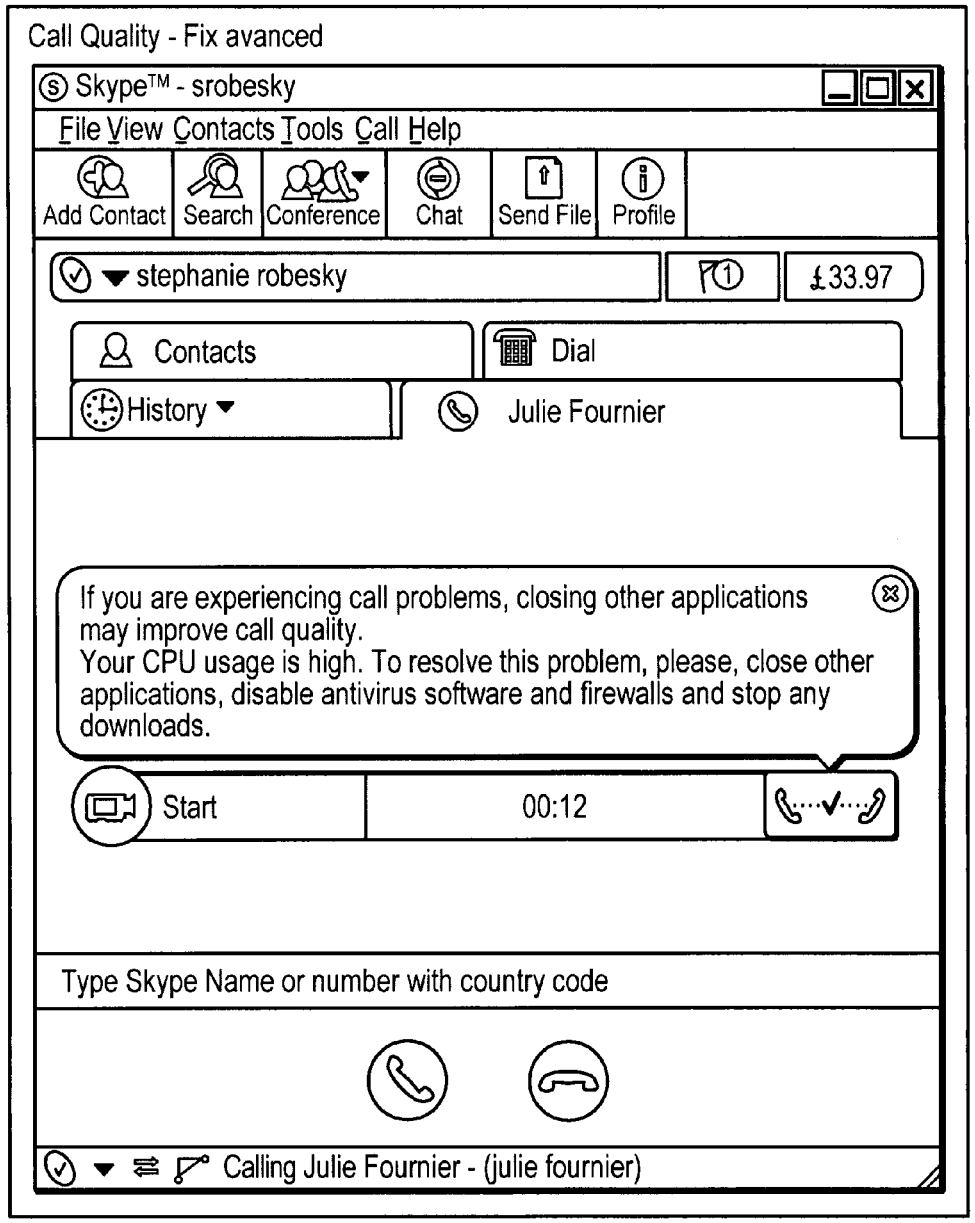

In an alternative embodiment of the invention the icon may sequentially change in appearance to indicate that there is a help message available. This is referred to as a glow sequence. An example of a glow sequence is shown in FIG. 6.

In a further embodiment of the invention when a user rolls over a call quality icon with the mouse a text string may be displayed indicating that the call quality may be enhanced.

FIGS. 7A-7B show possible text strings that are displayed when the user clicks an icon for different indications of call quality. A list of possible text strings for when the user rolls over an icon with the mouse is shown in FIG. 8.

A representation of display screens showing how help messages may appear on the screen during a call are shown in FIGS. 9-15.

While this invention has been particularly shown and described with reference to preferred embodiments, it will be understood to those skilled in the art that various changes in form and detail may be made without departing from the scope of the invention as defined by the claims.

What is claimed is:

1. A computer-implemented method of controlling communication quality of a communication between the computer and at least one node of a plurality of nodes in a packet switched communication system, the method comprising:
   detecting, using the computer, a condition that indicates that the communication quality of the communication is below an acceptable quality threshold, wherein the detecting includes an ability to detect one or more conditions associated with the computer;
   automatically generating, using the computer, a message based on the detected condition, the message comprising instructions intended to provide a remedy to improve the communication quality of the communication based on the detected condition;
   displaying, using the computer, the message based on the detected condition;
   displaying, using the computer and with the message, a selectable option associated with additional information;
   responsive to receiving selection of the selectable option, displaying the additional information, the additional information comprising at least one of:
      additional detail associated with a suggested cause of the detected condition; and
      additional instructions intended to provide a remedy to improve the communication quality of the communication based on the detected condition; and
   receiving, using the computer, input responsive to the instructions or the additional instructions to implement the remedy and thereby improve the communication quality of the communication.

2. A method as claimed in claim 1, wherein detecting the condition comprises monitoring a proportion of the computer's central processing units (CPUs) being used during the communication.

3. A method as claimed in claim 2 wherein responsive to detecting the proportion of CPUs is insufficient for the communication, generating the message to include instructions to close any applications running on the computer that are not involved in handling the communication.

4. A method as claimed in claim 1, wherein the condition relates to a round trip time (RTT) associated with the data in the communication.

5. A method as claimed in claim 4 wherein responsive to detecting the RTT exceeds an associated delay threshold, generating the message to include instructions to close any applications running on the computer that are not involved in handling the communication.

6. A method as claimed in claim 4 wherein responsive to detecting the RTT exceeds the associated delay threshold, generating the message to include instructions to disconnect and reconnect to the communication.

7. A method as claimed in claim 1 wherein the condition relates to determining a degree of data packets lost from data packets transmitted in the communication.

8. A method as claimed in claim 7 wherein responsive to the determining the degree of data packets lost exceeds a loss threshold, generating the message to include instructions to stop downloads from the internet.

9. A method as claimed in claim 1 wherein the condition relates to the type of router used in the communication.

10. A method as claimed in claim 1 wherein the computer is connected to a network via a wireless link.

11. A method as claimed in claim 1 wherein the plurality of nodes are connected to a same network.

12. A method as claimed in claim 1 wherein the plurality of nodes are connected to different networks.

13. A method as claimed in claim 10 wherein the condition relates to determining a signal strength of the wireless link.

14. A method as claimed in claim 13 wherein responsive to determining the signal strength is below a strength threshold, generating the message to include instructions to move the terminal closer to a router providing the wireless link.

15. A method as claimed in claim 1, wherein the condition relates to a speed of a processor associated with the computer.

16. A method as claimed in claim 1 wherein the displaying comprises displaying the instructions on a display screen associated with the user terminal.

17. A method as claimed in claim 16 wherein the instructions appear as a text message.

18. A method as claimed in claim 1 wherein the instructions are provided as soon as the condition is detected.

19. A method as claimed in claim 1 further comprising:
   responsive to detecting the condition providing, using the computer, information to the at least one other node of the plurality of nodes indicating poor call quality condition.

20. A user terminal in a packet switched communication system, said user terminal configured to enable a communication to at least one other terminal in the communication system, the user terminal comprising:
   at least one processor; and
   one or more computer-readable storage memories comprising processor-executable instructions which, responsive to execution by the at least one processor, are configured to enable the user terminal to:
      detect a condition that indicates that communication quality of the communication is below an acceptable threshold;
      automatically generate a message based on the detected condition, said message comprising instructions intended to provide a remedy to improve the communication quality of the communication based on the detected condition, including:
         a message including instructions to stop downloads to the user terminal as a solution to the condition;
         a message including instructions to close one or more applications as a solution to the condition;
         a message including instructions to stop video associated with the communication as a solution to the condition;
         a message including instructions to disable other applications attempting to using a call application associated with the communication as a solution to the condition;
         a message including instructions to restart the call application associated with the communication as a solution to the condition;
         a message including instructions to restart the communication as a solution to the condition;
         a message including instructions to adjust one or more associated firewall settings as a solution to the condition; and
         a message including instructions to adjust one or more router settings as a solution to the condition;
   provide access to the message; and
   receive input responsive to providing the instructions to implement the remedy and thereby improve the communication quality of the communication.

21. A user terminal as claimed in claim 20 wherein the condition relates to a proportion of central processing units (CPUs) of the at least one processor being used during the communication.

22. A user terminal as claimed in claim 21 further configured to receive input associated with an instruction to close any applications running on the processor that are not involved in handling the communication.

23. A user terminal as claimed in claim 20 which includes a router and wherein the condition relates to the type of router used in the communication.

24. A user terminal as claimed in claim 20 comprising a wireless link effecting the communication, and wherein the condition relates to a signal strength of the wireless link.

25. A user terminal as claimed in claim 20 wherein the instructions are provided on a display screen associated with the user terminal.

26. A computer program product comprising program code means which when executed by a computer implement the steps according to the method of claim 1.

27. A method as claimed in claim 1 further comprising displaying a communication quality indicator.

28. A method as claimed in claim 27, wherein displaying a communication quality indicator further comprises displaying the communication quality indicator via a Light Emitting Diode (LED).

29. A method as claimed in claim 1, wherein the communication comprises video data.

30. A method as claimed in claim 1, wherein the instructions, additional detail, or additional instructions comprise recommended system requirements associated with the computer.

31. A method as claimed in claim 1, wherein the detecting further comprises:
- detecting, using the computer, a Network Address Translation (NAT) router associated with the communication;
- determining, using the computer, whether the NAT router is unsuitable for the communication; and
- generating, using the computer, the message based, at least in part, on determining whether the NAT router is unsuitable.

32. The user terminal as claimed in claim 20, the detected condition comprising a slow Internet connection associated with the user terminal.

33. The user terminal as claimed in claim 20, the processor-executable instructions further configured to enable the user terminal to:
- display an icon configured to indicate the communication quality on a display associated with the user terminal;
- responsive to selection of the icon, provide access to the message by displaying the message on the display.

* * * * *